United States Patent Office 3,388,064
Patented June 11, 1968

3,388,064
PETROLEUM BASED LUBRICANT CONTAINING
A BIS-PHENOL STABILIZER
Byron A. Hunter, Woodbridge, and Francis X. O'Shea,
Wolcott, Conn., assignors to Uniroyal, Inc., a corporation of New Jersey
No Drawing. Original application Oct. 10, 1963, Ser. No. 315,368, now Patent No. 3,318,961, dated May 9, 1967. Divided and this application Nov. 7, 1966, Ser. No. 618,554
2 Claims. (Cl. 252—42)

ABSTRACT OF THE DISCLOSURE

Our invention resides in the use of bis[2-hydroxy-3-(alpha-methylxylyl)-5-methylphenyl] methane as a stabilizer for lubricating oils and greases.

---

This is a division of application Ser. No. 315,368, filed Oct. 10, 1963, now U.S. Patent 3,318,961 dated May 9, 1967.

This invention relates to a new chemical which possesses activity as a stabilizer for lubricating oils and greases.

The chemical of the present invention is bis[2-hydroxy-3-(alpha-methylxylyl)-5-methylphenyl]methane.

The chemical of the invention is prepared by reacting p-cresol with vinyltoluene (ortho-, meta- or paravinyl toluene, or mixtures of any of them) in approximately equimolar ratios to form the intermediate 2-(alpha-methylxylyl)-p-cresol. The intermediate 2-(alpha-methylxylyl)-p-cresol is reacted with approximately one-half mole of formaldehyde per mole of the intermediate to produce the bis[2 - hydroxy-3-(alpha-methylxylyl)-5-methylphenyl]methane having the formula:

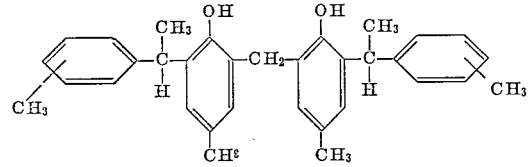

The p-cresol is reacted with the vinyl toluene in the presence of a Friedel-Crafts catalyst such as sulfuric acid, phosphoric acid, boron trifluoride, boron trifluoride etherate (boron trifluoride-diethyl ether complex), aluminum chloride, zinc chloride, etc. The resulting 2-(alpha-methylxylyl)-p-cresol is reacted with the formaldehyde in an acid medium, as in the presence of butylphosphoric acid (mixture of the mono- and di-butyl esters of phosphoric acid), sulfuric acid, p-toluene sulfonic acid, etc., with or without a solvent such as benzene, toluene, xylene, ethylene dichloride, etc. as at the reflux temperature of the solvent, or at temperatures from 100° C. to 125° C. without a solvent. The intermediate 2-(alpha-methylxylyl) p-cresol which is reacted with the formaldehyde may be in the form of the crude reaction product of the p-cresol and vinyl toluene, or the compound may be recovered from the crude reaction product as by distillation before reaction with the formaldehyde.

The following examples illustrate the invention. All parts and percentages referred to herein are by weight.

Example 1

The 2-(alpha-methylxylyl)-p-cresol was prepared as follows:

To a mixture of 1,080 g. (10 moles) of p-cresol and 54 g. of BF$_3$-etherate (boron trifluoride-diethyl ether complex) was added 1,180 g. (10 moles) of vinyltoluene (a commercial mixture of the meta- and para-isomers) at a rate sufficient to maintain the reaction temperature at 55–60° C. The addition required seven hours. The mixture was then allowed to stir for 16 hours at 55–60° C. Anhydrous ammonia was then bubbled through and the BF$_3$–NH$_3$ complex which precipitated was filtered off. The filtrate was fractionally distilled, 2-(alpha-methylxylyl)-p-cresol being collected as a liquid fraction, B.P. 143–155° C. at 0.3 mm., wt.—864 g.

The bis[2-hydroxy-3-(alpha-methylxylyl) - 5 - methylphenyl]methane was prepared as follows:

A mixture of 452 g. (2 moles) of the above prepared 2-(alpha-methylxylyl)-p-cresol, 31.5 g. (1 mole) of paraformaldehyde, 9 g. of butyl phosphoric acid and 100 ml. of benzene was heated under reflux at about 80° C. for 20 hours in a one-liter 3-neck flask equipped with a thermometer, mechanical stirrer, Stark and Dean trap and condenser. The water formed during the reaction and collected in the Stark and Dean trap amounted to 18.5 ml. (theory—18 ml.). The benzene was then removed under reduced pressure and 6 g. of propylene oxide was added to deactivate the catalyst. The extremely viscous product weighed 461 g.

*Analysis.*—Calculated: percent C, 85.3; percent H, 7.81. Found: percent C, 83.9; percent H, 7.90.

Example 2

This example demonstrates the usefulness of the compound of the present invention as a stabilizer for petroleum based lubricating oils. The compound may be incorporated in a concentration range of 0.1% to 2%, preferably 0.2% to 0.5% based on the weight of the lubricating oil.

The bis[2-hydroxy-3-(alpha-methylxylyl) - 5 - methylphenyl]methane was evaluated in a concentration of 0.3% by weight of a commercial petroleum based lubricating oil using ASTM–943 oxidation test for turbine oils. In the test, a mixture of 300 ml. of the oil and 60 ml. of distilled water is heated at 95° C. under a water cooled condenser. Copper and iron coils are submerged in the system and oxygen is bubbled through at the rate of three liters per hour. The break point is the amount of time required for the acidity of the mixture to rise to an acid number of 2 or for heavy sludge to develop with a corresponding large increase in viscosity.

The results showed less than 7 days to break for the oil alone and 80 days to break for the oil containing the [2 - hydroxy - 3 - (alpha - methylxylyl)-5-methylbenzyl] methane.

Example 3

This example demonstrates the usefulness of the compound of the present invention as a stabilizer for soap grease lubricants. The compound may be incorporated in a concentration range of 0.1% to 3%, preferably 0.2% to 1% based on the weight of the soap grease lubricant. Such soap grease lubricants are dispersions of a minor proportion of a metallic soap in a major proportion of mineral oil, usually with a small amount, e.g. up to 5% of water. The soap may be a lithium, sodium, potassium, calcium, barium or aluminum soap derived from animal or vegetable fats, or soap-forming fatty acids, e.g. stearic, oleic, palmitic or lauric acids, or wool fat, or rosin acids, or petroleum acids, e.g. naphthenic acids. The mineral oil will consist of varying proportions of paraffinic, naphthenic, aromatic and mixed petroleum oils.

The bis[2-hydroxy-3-(alpha - methylxylyl) - 5 - methylphenyl]methane was evaluated by mixing into a commercial lithium soaps grease at 0.5% concentration, spreading the grease as a 30–35 mil (0.030 to 0.035″) thick film on a steel plate and aging in an oven at 300° F. Degradation of the grease is demonstrated by a significant change in the physical form of the grease manifested by either flowing off the plate or hardening.

The grease alone showed degradation after 1 day whereas the grease containing bis[2-hydroxy-3-(alpha-methylxylyl)-5-methylphenyl]methane did not show degradation until 110 days.

In view of the many changes and modifications that may be made without departing from the principles underlying the invention, reference should be made to the appended claims for an understanding of the scope of the protection afforded the invention.

Having thus described our invention, what we claim and desire to protect by Letters Patent is:

1. Petroleum based lubricating oil containing a minor amount of bis[2-hydroxy-3-(alpha-methylxylyl)-5-methylphenyl]methane sufficient to stabilize against oxidation.

2. Petroleum based soap grease lubricant containing a minor amount of bis[2-hydroxy-3-(alpha-methylxylyl)-5-methylphenyl]methane sufficient to stabilize against oxidation.

References Cited
UNITED STATES PATENTS

| | | | |
|---|---|---|---|
| 2,636,905 | 4/1953 | Kehe et al. | 252—52 X |
| 2,731,443 | 1/1956 | Forman | 260—45.95 |
| 3,057,928 | 10/1962 | Koblitz et al. | 260—619 |
| 3,290,250 | 12/1966 | Orloff et al. | 252—54 |

DANIEL E. WYMAN, *Primary Examiner.*

W. H. CANNON, *Assistant Examiner.*